US009971507B2

(12) United States Patent
Smithers

(10) Patent No.: US 9,971,507 B2
(45) Date of Patent: May 15, 2018

(54) SYSTEMS AND METHODS FOR REDUCING STORAGE REQUIREMENT FOR STORING INFORMATION DEFINING A VIRTUAL SPACE

(71) Applicant: DISNEY ENTERPRISES, INC., Burbank, CA (US)

(72) Inventor: Andi Smithers, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 148 days.

(21) Appl. No.: 15/194,390

(22) Filed: Jun. 27, 2016

(65) Prior Publication Data

US 2017/0371545 A1 Dec. 28, 2017

(51) Int. Cl.
*G06F 3/06* (2006.01)

(52) U.S. Cl.
CPC ............ *G06F 3/0604* (2013.01); *G06F 3/067* (2013.01); *G06F 3/0626* (2013.01); *G06F 3/0629* (2013.01); *G06F 3/0664* (2013.01)

(58) Field of Classification Search
None
See application file for complete search history.

(56) References Cited

U.S. PATENT DOCUMENTS 5,793,371 A * 8/1998 Deering .................. G06T 9/001 345/418
6,166,748 A * 12/2000 Van Hook .............. A63F 13/00 345/522
6,438,266 B1 * 8/2002 Bajaj ....................... G06T 9/001 382/154

* cited by examiner

*Primary Examiner* — Xin Sheng
(74) *Attorney, Agent, or Firm* — Sheppard Mullin Richter & Hampton LLP

(57) ABSTRACT

Systems and methods of reducing storage requirements for storing information defining a virtual space are presented herein. In particular, a compressed format of information defining a virtual space may be generated. The virtual space may include virtual space content modeled as polygons. An individual polygon may be defined by an individual set of vertices. The information defining the virtual space may include vertex position information, and/or other information. The vertex position information may comprise individual positions of individual vertices of individual polygons represented as vectors having vector components.

20 Claims, 4 Drawing Sheets

| Representation | Vector Component Values | | |
|---|---|---|---|
| Decimal | 1.0 | 1.1 | 1.2 |
| Floating Point Format | Sign=0<br>Exponent=127<br>Mantissa=0 | Sign=0<br>Exponent=127<br>Mantissa=838861 | Sign=0<br>Exponent=127<br>Mantissa=1677722 |
| Binary Encoding | 00111111100000000000000000000000 | 00111111100011001100110011001101 | 00111111100110011001100110011010 |

SYSTEMS AND METHODS FOR REDUCING STORAGE REQUIREMENT FOR STORING INFORMATION DEFINING A VIRTUAL SPACE

FIELD OF THE DISCLOSURE

This disclosure relates to electronically storing information defining a virtual space.

BACKGROUND

A virtual space may comprise a simulated space. The simulated space may include virtual objects, topography, and/or other virtual space content. The virtual space may be accessible to users via computing platforms. In some implementations, users may access the virtual space through communications with a host server (e.g., a virtual space server). In some implementations, the virtual space may be accessed via information stored locally at individual computing platforms (e.g., via a cartridge, disk, a memory card/stick, flash memory, electronic storage, and/or other storage). Individual computing platforms may utilize runtime memory while accessing an instance of the virtual space.

The storage requirements of one or more of the host server, runtime memory of a computing platform, and/or removable storage of a computing platform (e.g., a cartridge, disk, a memory card/stick, flash memory, electronic storage, and/or other storage) may be quite substantial. In some instances, users of the virtual space may create and/or generate content, referred to as user-generated content. This may further burden an entity that may be required to store information that defines the virtual space since the virtual space content may be continuously growing.

In conventional electronic storage, computers may store numerical values in floating-point format. Floating point is a formulaic representation that approximates a real number. When performing calculations, programmers general create computer program components configured to carry out floating-point-specific arithmetic techniques developed along with the technical standards of IEEE 754. The standards generally define one or more of arithmetic formats; interchange formats; rounding rules; operations; exception handling; and/or other aspects of floating-point arithmetic. Arithmetic formats may correspond to sets of binary and decimal floating-point data, which may consist of finite numbers (including signed zeros and subnormal numbers), infinities, and/or special "not a number" values (NaNs). Interchange formats may correspond to encodings (bit strings) that may be used to exchange floating-point data in an efficient and compact form. Rounding rules may correspond to properties to be satisfied when rounding numbers during arithmetic and/or conversions. Operations may correspond to arithmetic and/or other operations on arithmetic formats. Exception handling may correspond to indications of exceptional conditions (such as division by zero, overflow, etc.). In modeling a virtual space, knowledge of the standards of IEEE 754 may be a prerequisite.

SUMMARY

One aspect of the disclosure relates to a system configured for reducing storage requirements for storing information defining a virtual space, in accordance with one or more implementations. In particular, reduction may be accomplished the information defining a virtual space being manipulated in a manner such that the amount of storage space required to store the information may be substantially reduced (e.g., compared to the non-manipulated information). In some implementations, an amount of storage space required may relate to a quantity of encoded bits required to store information defining the virtual space.

In some implementations, the system may comprise one or more of non-transitory electronic storage, one or more physical processor configured by machine-readable instructions, and/or other components. The machine-readable instructions may comprise one or more of a space component, a normalization component, a conversion component, a storage component, and/or other components.

The non-transitory electronic storage may be configured to storing information defining a virtual space. The virtual space may include virtual space content modeled as polygons. An individual polygon may be defined by an individual set of vertices. The information defining the virtual space may include vertex position information, and/or other information. The vertex position information may comprise individual positions of individual vertices of individual polygons. The individual positions may be represented as vectors having vector components, and/or other representations. Individual values of the individual vector components may be represented as floating point numbers and/or other formats of numbers. Individual values of the individual vector components may be encoded in bits within the electronic storage. An individual floating point number may have one or more of a sign, an exponent, a mantissa, and/or other components.

The normalization component may be configured to perform one or more of: identifying a first set of polygons and/or other sets of polygons of a model of a virtual space, the first set of polygons may have a first set of vertices; obtaining, from the non-transitory electronic storage, individual values of a subset of the vector components of the individual positions of the individual vertices of the first set of vertices and/or other sets of vertices; normalizing the individual values of the subset of vector components; and/or other operations. Individual vertices in the first set of vertices may have individual positions within the virtual space. The individual positions of the individual vertices in the first set of vertices may be represented by individual values of the individual vector components. The individual values may be encoded in a first quantity of bits and/or other quantity of bits.

The conversion component may be configured to perform one or more of: converting the individual normalized values to individual integer representations and/or other representations of the individual normalized values; identifying individual portions of the encoded bits of the individual integer representations of the individual normalized values; and/or other operations. The individual integer representations of the individual normalized values may be encoded in a second quantity of bits and/or other quantity of bits. The second quantity of bits may be less than the first quantity of bits. In some implementations, for individual integer representations of the individual normalized values, individual first portions, individual second portions, and/or other portions of the encoded bits may be identified. An individual first portion may be a third quantity of bits and/or other quantity of bits. An individual second portion may be a fourth quantity of bits, and/or other quantity of bits.

The storage component may be configured to effectuate storage of individual identified portions of the encoded bits of the individual integer representations as values of individual ones of the vector components of the positions of individual vertices. By way of non-limiting illustration, for individual vertices of the first set of vertices, the storage component may be configured to effectuate storage of the individual first portions of the encoded bits of the individual integer representations as the encoded bits for the individual values of individual vector components included in the subset of vector components of the position of the individual vertices in the first set of vertices of the first set of polygons. By way of non-limiting illustration, storage component may be configured to effectuate storage of the individual second portions of the encoded bits of the individual integer representations as the encoded bits of an individual value of another one of the vector components not included in the subset of vector components.

The space component may be configured to execute an instance of a virtual space and implement the of the virtual space executed by machine-readable instructions using information stored by storage component, and/or other information. In some implementations, space component may utilize a GPU implementing one or more programs and/or routines referred to as "shaders."

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

BRIEF DESCRIPTION OF THE DRAWINGS

FIG. 3 illustrates various representations of exemplary vector component values and corresponding encoded bits.

DETAILED DESCRIPTION

Figure 1:
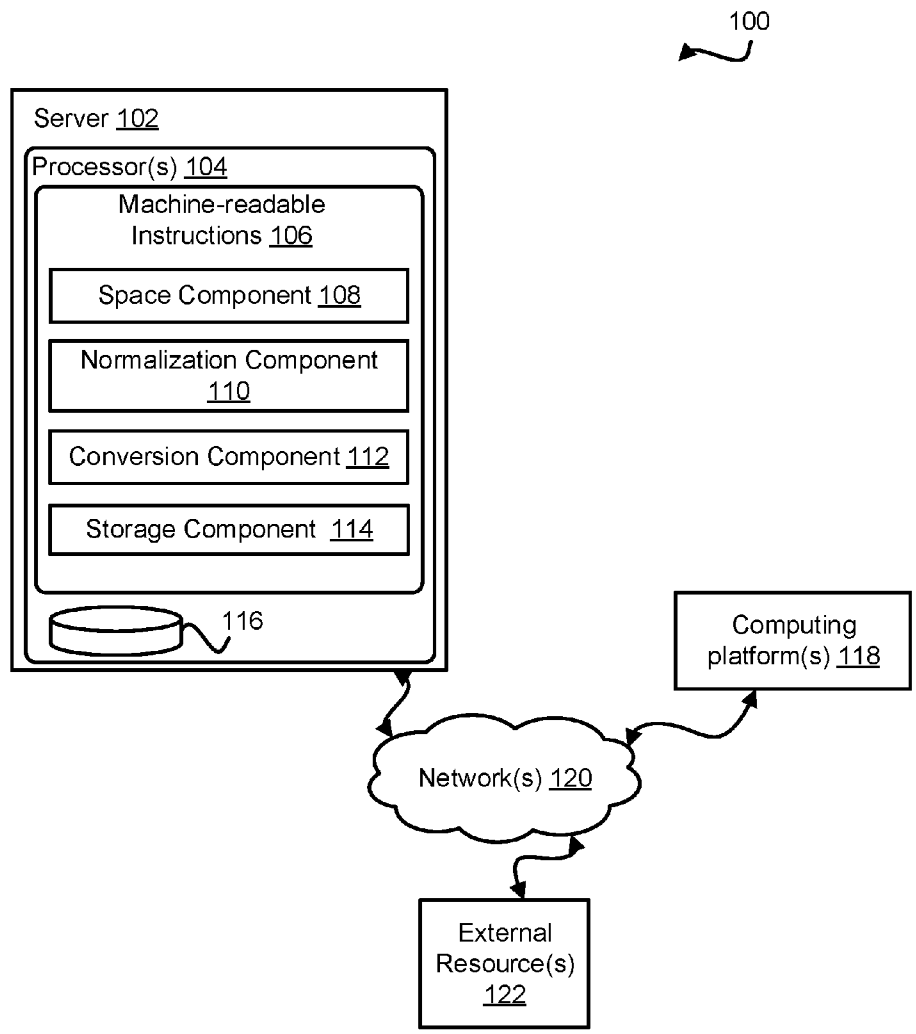
FIG. 1 illustrates a system configured reducing storage requirements for storing information defining a virtual space, in accordance with one or more implementations.

FIG. 1 illustrates a system 100 configured for reducing storage requirements for storing information defining a virtual space, in accordance with one or more implementations. In particular, reducing the storage requirements may generally refer to the information defining a virtual space being manipulated in a manner such that the amount of storage space used to store the information may be substantially reduced (e.g., compared to the non-manipulated information). In some implementations, an amount of storage space required may relate to a quantity of bits utilized to store information defining the virtual space within electronic storage media. The information defining a virtual space may refer to one or more of source code, a representation of source code, commands, and/or other information that may define and/or other facilitate defining a virtual space.

The system 100 may include one or more of one or more servers (e.g., server 102 and/or other servers), one or more computing platforms 118, and/or other components. The server 102 may include one or more of one or more processors 104, electronic storage 116, and/or other components. The one or more processors 104 may be configured by machine-readable instructions 106. Executing the machine-readable instructions 106 may cause the one or more processors 104 to facilitate reducing storage requirements for storing information defining a virtual space. The machine-readable instructions 106 may include one or more of a space component 108, a normalization component 110, a conversion component 112, a storage component 114, and/or other components.

The space component 108 may be configured to implement one or more instances of the virtual space executed by machine-readable instructions 106 to determine views of the virtual space. In some implementations, the virtual space may be hosted by server 102 such that the views may then be communicated (e.g., via streaming, via object/position data, and/or other information) from server 102 to individual computing platforms 118 for presentation to users. The view determined and presented to a given user may correspond to a game entity being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

In some implementations, the virtual space may be accessed via information stored locally at individual computing platforms (e.g., via a cartridge, disk, a memory card/stick, flash memory, electronic storage, and/or other storage). In such implementations, an individual computing platform may include one or more physical processors configured by machine-readable instructions. The machine-readable instructions of a given computing platform may include computer program components that may be the same or similar as the computer program components of machine-readable instructions 106 of server 102. Individual computing platforms may utilize runtime memory for executing, implementing, and/or otherwise accessing an instance of the virtual space.

The instance of the virtual space may comprise a simulated space that is accessible by one or more users via one or more computing platforms 118 that present the views of the virtual space to the one or more users. The simulated space may include virtual space content. Virtual space content may include one or more of virtual objects, topography, and/or other virtual space content. The simulated space may express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by space component 108 is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

Virtual items may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual items and/or goods.

The users may participate in the instance of the virtual space by controlling one or more of the available user controlled elements in the virtual space. Control may be exercised through control inputs and/or commands input by the users through computing platform(s) 102. The users may interact with each other through communications exchanged within the virtual space. Such communications may include one or more of textual chat, instant messages, private messages, voice communications, and/or other communications. Communications may be received and entered by the users via their respective computing platform(s) 102. Communications may be routed to and from the appropriate users through server(s) 102.

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, a virtual space may be generated from one or more virtual space models. A model may describe an N-dimensional space. An N-dimensional space may comprise one or more of a two-dimensional simulated space, a three-dimensional simulated space, and/or other dimensions of a space. In some implementations, a model may comprise a plurality of discrete polygons and/or other elements of the model. Multiple polygons may be linked together to form a polygonal mesh. A polygonal mesh may represent one or more of a surface, a boundary, and/or other virtual space content of the virtual space. By way of non-limiting example, an individual polygon mesh may represent a surface and/or boundary of one or more of a virtual object, topography, and/or other virtual space content.

Individual polygons may be defined by individual sets of points called vertices (or vertexes). Individual vertices may have positions within a simulated space. Individual positions of individual vertices may be represented as vectors having vector components, and/or other components. The vector components may be defined with respect to a coordinate system that corresponds to dimensions of the space. A coordinate system may include one or more of Cartesian coordinates, polar coordinates, cylindrical coordinates, spherical coordinates, homogeneous coordinates, and/or other coordinate systems. A coordinate system may have an origin within the dimensions of a space.

In a three-dimensional space, vector components defining a position of a vertex may comprise one or more of a first vector component, a second vector component, a third vector component, and/or other vector components. In a Cartesian coordinate system, individual ones of the first vector component, the second vector component, and the third vector component may comprise respective ones of an x-component, y-component, a z-component, and/or other components. In some implementations, vector coordinates of a three-dimensional vertex may further include a fourth vector component. The fourth vector component may comprise, within a Cartesian coordinate system, a w-component. In some implementations, within a three-dimensional Cartesian coordinate system, a value of a w-component may be specified as zero, since the fourth dimension of the space may not be visualized within the space.

In some implementations, a polygon may comprise an area formed from at least three vertices. In some implementations, the polygon having three vertices may form a triangle.

It is noted that the above description of vector components being specified with respect to a three-dimensional Cartesian coordinate system is provided for illustrative purposes only and is not to be considered limiting. For example, in some implementations, vector components may be expressed in other ways.

Figure 2:
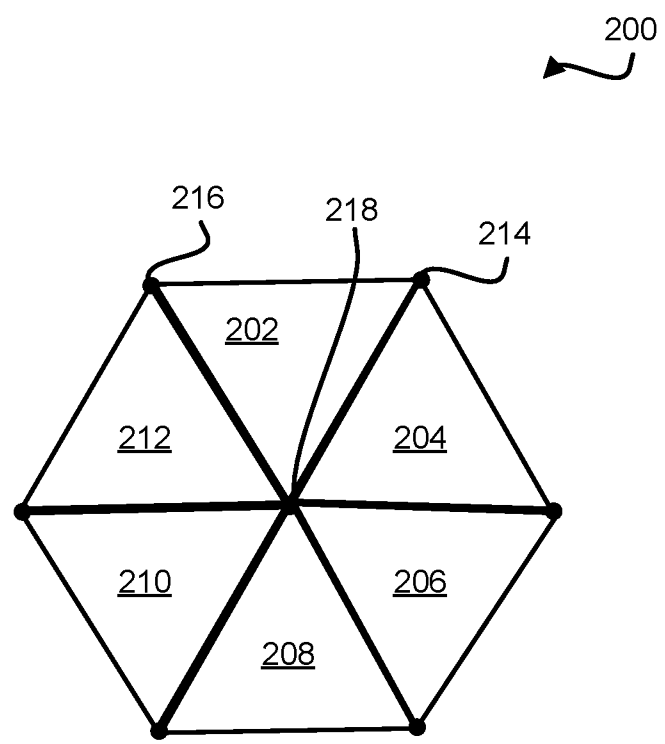
FIG. 2 illustrates an exemplary polygonal mesh that may comprise part of virtual space model.

By way of non-limiting illustration in FIG. 2, an exemplary polygonal mesh 200 is shown. The polygonal mesh 200 may include a set of discrete polygons that may form the polygonal mesh 200. By way of non-limiting example, the set of polygons of the polygonal mesh 200 may include one or more of a first polygon 202, a second polygon 204, a third polygon 206, a fourth polygon 208, a fifth polygon 210, a sixth polygon 212, and/or other discrete polygons. It is noted that the depiction in FIG. 2 is for illustrative purposes only and is not to be considered limiting. For example, in some implementations, a virtual space model may be comprised of hundreds, thousands, or millions of individual discrete polygons to form the model.

In FIG. 2, first polygon 202 may be defined by a set of vertices. The set of vertices may include one or more of a first vertex 214, a second vertex 216, a third vertex 218, and/or other vertices. Individual ones of the vertices in the set of vertices may have positions within a simulated space. Individual positions of individual vertices in the set of vertices may be represented as vectors having vector components, and/or other components. By way of non-limiting example, individual ones of the first vertex 214, the second vertex 216, the third vertex 218, and/or other vertices may have positions specified by individual values for individual ones of a first vector component, a second vector component, a third vector component, and/or other vector components.

Returning to FIG. 1, non-transitory electronic storage 116 and/or other electronic storage may be configured to store information defining a virtual space, and/or other information. The information defining the virtual space may include one or more of vertex position information, direction information, appearance information, and/or other information.

Appearance information may correspond to individual vertices and/or individual polygons defined by a set of vertices. Appearance information may include one or more of color information, texture information, skin information, and/or other information.

Color information may specify values for one or more color attributes associated with individual vertices and/or individual polygons defined by a set of vertices.

Texture information may specify values for one or more translucency attributes associated with individual vertices and/or individual polygons defined by a set of vertices. In some implementations, values for a translucency attribute may include texture coordinates that may refer to a color map, and/or other information.

Skin information may specify individual values for one or more of a bone attribute, weight influence attribute, and/or other attributes associated with individual vertices and/or individual polygons defined by a set of vertices.

Direction information may correspond to individual vertices and/or individual polygons defined by a set of vertices. By way of non-limiting example, direction information may include one or more of normal information, tangent information, bi-normal information, and/or other information. Normal information may specify a value of a unit normal vector conveying a direction that a surface of polygon and/or individual vertices of a polygon may face. Tangent information may specify a unit tangent vector that may be tangent to a surface of polygon and/or individual vertices of a polygon. Bi-normal information may specify a unit vector that may be a cross product of a unit tangent vector and a unit normal vector.

Vertex position information may include individual positions of individual vertices of individual polygons within a model of a virtual space. Individual positions may be specified by values of individual vector components of individual vertices. In some implementations, individual values of individual vector components may be represented as one or more of a decimal number, a floating point number, and/or representations. The individual values may be encoded as binary strings within non-transitory electronic storage 116 and/or other electronic storage (e.g., a cartridge, disk, a memory card/stick, flash memory, electronic storage, and/or other storage).

A floating point number (e.g., a number in floating-point format) may comprise one or more of a sign component, an exponent component, a mantissa component, and/or other components. A single-precision floating point number may be encoded as a 32-bit string. A double-precision floating point number may be encoded as a 64-bit string. A long double precision floating point number may be encoded as an 80-bit string.

For single-precision, a sign component may be encoded as single bit, an exponent component may be encoded as an 8-bit string; and a mantissa component may be encoded as a 23-bit string. A value of a sign may be either "0" for positive, or "1" for negative. A single-precision floating point number include a 1-bit sign, an 8-bit exponent, a 23-bit mantissa, and/or other information.

FIG. 3 illustrates decimal and floating-point format representations of values of vector components and the encoded binary stings that store the values within electronic storage. It is noted that the values used in FIG. 3 are for illustrative purposes only and not to be considered limiting.

In FIG. 3, as shown in the first row, arbitrary decimal values for vector components of 1.0, 1.1, and 1.2 are considered. In the next row, floating point format representations of these numbers are shown. Obtaining floating point number representations may be accomplished through one or more decimal-to-floating point conversion techniques. By way of non-limiting example, a conversion technique may include arithmetic techniques associated with the technical standards of IEEE 754, and/or other techniques. For example, the decimal value of 1.0 may be represented in floating point format being with a sign encoded as "0," an exponent of "127," and a mantissa of "0." The decimal value of 1.1 may be represented by a floating point number encoded with a sign of "0," an exponent of "127," and a mantissa of "838861." The decimal value of 1.2 may be represented by a floating point number encoded with a sign of "0," an exponent of "127," and a mantissa of "1677722." In the third row, binary encoding of the values is shown. The decimal value of the 1.0 may be encoded as a binary string of "00111111100000000000000000000000." The decimal value of 1.1 may be encoded as a binary string of "00111111100011001100110011001101." The decimal value of 1.2 may be encoded as a binary string "00111111100110011001100110011010."

The different components of the floating point number representations (e.g., sign, exponent, and mantissa) may be associated with particular portions of encoded bit strings. By way of non-limiting example, referring the binary string 300 for the decimal number 1.0, a portion 302 comprising one bit may represent the sign component, a portion 304 comprising the next eight bits may represent the exponent component, and a portion 306 comprising the last twenty three bits may represent the mantissa component of a floating point number.

By way of non-limiting illustration, values of vector components of a vertex in a three-dimensional Cartesian space (including the w-component forced to zero) may have decimal values of (1.0, 1.1, 1.2, 0). This vertex position may be encoded within electronic storage in binary as (00111111100000000000000000000000, 00111111100011001100110011001101, 00111111100110011001100110011010, 00000000000000000000000000000000). As such, each vertex may require 128 bits of storage (e.g., 32 bits per number times four vector component values).

It is noted that although the depiction in FIG. 3 is directed toward single-precision format (e.g., 32 bits encoded), this is for illustrative purposes only and not to be considered limiting. For example, one or more features and/or functions presented herein may be similarly carried out with double-precision format (e.g., 64 bits encoded), and/or other formats.

Returning to FIG. 1, the normalization component 110 may be configured to identify one or more sets of polygons of a model of a virtual space, and/or perform one or more other operations. By way of non-limiting illustration, normalization component 110 may be configured to identify a first set of polygons and/or other sets of polygons. The first set of polygons may have a first set of vertices and/or other vertices. Individual vertices in the first set of vertices may have individual positions within the virtual space. The individual positions of the individual vertices in the first set of vertices may be represented by individual values of individual vector components.

In some implementations, normalization component 110 may be configured to identify one or more sets of polygons based on the one or more sets of polygons modeling one or more of a shared region of the virtual space, a virtual object within the virtual space, and/or other virtual space content. By way of non-limiting illustration, the first set of polygons may represent a particular grouping of polygons in a model of a virtual space corresponding to a region of shared geometry in the simulated space. By way of non-limiting illustration, the first set of polygons may define one or more of an area of shared topography, one or more virtual objects, and/or other virtual space content.

In some implementations, normalization component 110 may be configured to obtain, from non-transitory electronic storage 116, individual values of one or more vector components of individual vertices of the identified one or more sets of polygons, and/or perform one or more other operations. In some implementations, individual values may be obtained for a subset of the available vector components.

By way of non-limiting illustration, normalization component 110 may be configured to obtain, from non-transitory electronic storage 116, individual values of a subset of the vector components of the individual vertices of the first set of vertices and/or other identified sets of vertices. In some implementations, the subset of the vector components may comprise vector components whose values may provide useful vertex position information. By way of non-limiting example, in a three-dimensional Cartesian space that includes an x-component, y-component, z-component, and w-component, the subset of the vector components may include the x-component, y-component, and z-component, and/or other subset of the vector components.

In some implementations, normalization component 110 may be configured to normalize individual values of a subset of vector components of the individual vertices of one or more sets of polygons, and/or perform one or more other operations. In some implementations, normalization may be based on individual bounding volumes of individual sets of polygons, and/or other information.

In some implementations, normalization component 110 may be configured to determine individual bounding volumes for individual sets of polygons, and/or perform one or more other operations. In some implementations, a bounding volume may include one or more of an axis aligned bounding box (AABB), oriented bounding box (OBB), and/or other bounding volume of the set of polygons. In some implementations, a bounding volume may be determined using computational geometry techniques, and/or other techniques. In some implementations, a computational geometry technique may include a three-dimensional rotating calipers technique, and/or other techniques.

In some implementations, normalization component 110 may be configured to determine a length of a bounding volume, and/or other information. In some implementations, the length of the bounding volume may correspond to the extents of a geometry within the virtual space defined by a set of polygons. The extents may be determined from smallest and largest values of individual vector components of the vertices of a set of polygons. By way of non-limiting example, the extents in a first coordinate direction may be determined based on a difference between the smallest value of a first vector component the largest value of the first vector component. By way of non-limiting example, in a three-dimensional Cartesian coordinate system, the extents in x-coordinate direction may be determined based on a difference between the smallest value of the x-component values and the largest value of the x-component values of individual vertices of the set of polygons.

In some implementations, normalization component 110 may be configured to determine a centroid of the bounding volume, and/or other information. In some implementations, a centroid may have a centroid position in the virtual space. The centroid position may be represented as a vector having vector components. In some implementation, the centroid may be determined by one or more techniques.

In some implementations, normalization component 110 may be configured to normalize individual values of a subset of vector components of the individual vertices of individual sets of polygons based on one or more of a centroid of a bounding volume of an individual set of polygons, a length of the bounding volume (e.g., the extents of the geometry defined by the individual set of polygons), and/or other information.

In some implementations, an individual value of an individual vector component of a vertex may be normalized by one or more of: subtracting a value of a corresponding vector component of a centroid of a bounding volume from the individual value, dividing the preceding calculated value by a length of the bounding volume, and/or other operations. This may generally be expressed as:

$$NormVal_i = \frac{Val_i - ValCentroid_i}{BoundingVol_{lenth}}$$

where "i" represents the vector component (e.g., one of an x-component, y-component, z-component, and/or other components), Val is the value of the vector component of the vertex, ValCentroid is the value of the vector component of the centroid, and $\text{BoundingVol}_{lenth}$ is the length of the bounding volume. The normalization may remove scale from the values and/or may cause values to be transformed into a normalized space, e.g., having a range of −1 to 1. The normalized values may be encoded in floating-point format and/or other formats. The normalized values may be encoded in a first quantity of bits based on the floating point format of the non-normalized values in. By way of non-limiting illustration, the (non-normalized) values may be represented in single-precision floating-point format (e.g., 32-bit binary string) such that the normalized values may also be encoded as 32-bit binary strings.

It is noted that the above technique for normalizing values is provide for illustrative purposes only and is not to be considered limiting. In some implementations, normalization may be accomplished by one or more other techniques.

The conversion component 112 may be configured to obtain individual normalized values of vector components, and/or perform other one or more other operations. By way of non-limiting illustration, conversion component 112 may obtain individual normalized values from normalization component 110.

The conversion component 112 may be configured to convert individual normalized values to individual integer representations of the individual normalized values, and/or perform one or more other operations. Individual integer representations of individual normalized values may be encoded in less bits than the floating point format representations of the individual normalized values. By way of non-limiting illustration, individual integer representations of individual normalized values may be encoded in a second quantity of bits. The second quantity of bits may be less than the first quantity of bits.

In some implementations, conversion component 112 may utilize one or more conversion techniques. In some implementations, a conversion technique may include one or more of bitwise operations, a "float-to-int" coding operation, and/or other operations. A bitwise operation may include one or more of left bit shifting, right bit shifting, bit masking, and/or other techniques.

By way of non-limiting illustration, conversation component 112 may be configured to convert individual normalized values that may be in single-precision floating-point format (e.g., 32 encoded bits) to individual 21-bit integers, and/or other integer representations. In some implementations, this conversation may be performed using a bitwise left shift operation, and/or other techniques. In some implementations, this operation may be expressed in code as "(1<<21)−1" (read as "1 shifted by 21 minus 1"). By way of non-limiting illustration, an operation of 1<<21 may take a single bit and move it 21 bits to the left. However the value may be actually larger than 21-bits of information, e.g., the shifted bit may be in the 22nd bit. By subtracting 1 a range of values using the full 21 bits range may be generated. By way of non-limiting illustration, the operation of 1<<3 equals 8, which may be represented as 1000 in binary. The operation gives us 4 bits of information, and subtracting 1 gives us 0111 in binary, representing fully populated 3 bits of information. Multiplying a unit value of 1 by this value may be guaranteed to fit in the available bits. Unit value may be in the 0-1 range.

In some implementations, converting individual normalized values to individual integer representations (e.g., that are encoded in the second quantity of bits) may include multiple steps. By way of non-limiting illustration, in a first step, individual normalized values may be converted into individual integer representations that may be encoded in a third quantity of bits and/or other quantities of bits. By way of non-limiting illustration, in a second step, individual normalized values may be converted into individual integer representations that may be encoded in a fourth quantity of bits and/or other quantity of bits. The sum of the third quantity and fourth quantity may equal the second quantity of bits.

By way of non-limiting illustration, for a conversion to a 21-bit integer (e.g., the second quantity of bits being 21) in a multi-step procedure as described above, the third quantity may comprise 16-bits, and/or the fourth quantity may comprise 5 bits. The conversion to a 21-bit integer may comprise one or more of converting individual normalized values to a 16-bit integer, converting individual normalized values to a 5-bit integer, and/or other operations. For example, conversation component 112 may be configured to convert individual normalized values that may be in single-precision floating-point format to individual 16-bit integers (first step) and/or individual 5-bit integers (second step). In some implementations, this conversation may be performed using a bitwise left shift operation, and/or other techniques. In some implementations, a conversion into a 16-bit integer may be written in code as "(1<<16)−1" (read as "1 shifted by 16 minus 1"). In some implementations, a conversion into a 5-bit integer may be written in code as "(1<<5)−1" (read as "1 shifted by 5 minus 1").

In some implementations, conversation component 112 may be configured to identify individual portions of encoded bits of the individual integer representations of the individual normalized values. In some implementations, an individual portion may comprise one or more of most significant bits, least significant bits, and/or other portions. In some implementations, the individual portions that may be identified may correspond to a predetermined quantity and/or section of the bit strings used to encode the individual integer representations of the individual normalized values. By way of non-limiting illustration, for individual integer representations of the individual normalized values, one or more of a first portion, a second portion, and/or other portions of the encoded bits may be identified. In some implementations, the sum of the quantities of bits of the individual bit portions may equal the total number of bits used to encode the individual values.

In some implementations, when the conversion to the individual integer representations of the individual normalized values may be performed in a single step, the individual portions may be specifically identified from the encoded bits of the individual integer representations. By way of non-limiting illustration, conversion from the individual normalized values in single-precision floating-point format to the individual 21-bit integers may return the a 21 bit string. The first portion may comprise a 5-bit string, and the second portion may comprise a 16-bit string. Identifying the first portion may comprise identifying the encoded binary values for bits one through five. Identifying the second portion of bits may comprise identifying the encoded binary values for bits six through twenty one.

In some implementations, when the conversion to the individual integer representations of the individual normalized values may be performed in multiple steps, the individual portions may be identified from the individual integer representations returned at individual ones of the steps. By way of non-limiting illustration, conversion from the individual normalized values in single-precision floating-point format to individual 21-bit integers using the two step process of doing a 16-bit integer conversion and a 5-bit integer conversion may return, for individual ones of the normalized values, a 16-bit string and a 5-bit string, respectively. The first portion may comprise a 5-bit string, and the second portion may comprise a 16-bit string. The first portion may comprise the determined 5-bit string. The second portion may comprise the 16-bit string.

In some implementations, a first portion of bits, such as a 16-bit string (e.g., as the most significant bits), may be distinguished from a second portion of bits, such as a 5-bit string (e.g., as the least significant bits). Some processing devices, such as a GPU, may not allow for a −0 mode for a floating-point unit (FPU) implementation. If a centroid that generates data in signed space (vs unsigned space) then we get −1 to 1 in unit-space where the sign has to be preserved in the second portion if the first portion value is 0 (this being it could be −0 and not +0). One distinction may be that lost sign information may change the behavior of those second portion when reconstituting the floating point number (e.g., out of the normalized space). In some implementations, it may desired to preserve the sign bit in the second portion. This may result in 4-bits plus a sign bit for the second portion. This may still result in the second portion having 5 bits of information but may be encoded as −16 to +16 integer value in the second portion (e.g., least significant bits).

In some implementations, the storage component 114 may be configured to, for individual vertices, effectuate storage of individual portions of encoded bits of individual integer representations of individual normalized values as the values for particular ones of the vector components that define position of the vertices. In some implementations, for individual vertices, individual portions of the encoded bits of the individual integer representations may be stored as the encoded bits for the individual values for a subset of vector components, while other individual portions of the encoded bits of the individual integer representations may be stored as the encoded bits for individual values of a vector component not included in the subset of vector components.

By way of non-limiting example, for individual vertices of the first set of vertices, storage component 114 may be configured to effectuate storage of the individual first portions of the encoded bits of the individual integer representations of the individual normalized values of the subset of the vector components of the individual vertices of the first set of vertices, as the encoded bits for the individual values of individual vector components included in the subset of vector components. For individual vertices of the first set of vertices, storage component 114 may be configured to effectuate storage of the individual second portions of the encoded bits of the individual integer representations of the individual normalized values of the subset of the vector components of the individual vertices of the first set of vertices as the encoded bits of an individual value of another one of the vector components not included in the subset of vector components.

In some implementations, storage of individual portions of encoded bits of individual integer representations of individual normalized values as values for particular ones of the vector components that define position of the vertices may be performed using one or more techniques include one or more of bitwise operations, bit manipulation, bit truncation, bit rotations, masking, and/or other techniques.

By way of non-limiting illustration, consider a vertex of a polygon within a three-dimensional coordinate system. The vertex may have a position defined by a first value of a first vector component, a second value of a second vector component, a third value of a third vector component, and/or other vertex position information. In a Cartesian coordinate system, there may also be a fourth value (that is null or "zero") for a fourth vector component. Individual ones of the first value, second value, and/or third value may be stored as 32-bit binary strings (e.g., corresponding to single precision floating point format). Individual ones of the first value, second value, and third value may be normalized (see, e.g., normalization component 110) and converted to corresponding integer representations (see, e.g., conversion component 112). In some implementations, the individual integer representations may be 21-bit integers (or a 16-bit integer and a 5-bit integer). From individual ones of the 21-bit integer representations of the individual values, a 5-bit portion of the 21-bit binary string may be identified from bits 1 to 5 of the 21-bit binary string. From individual ones of the 21-bit integer representations of the individual values, a 16-bit portion of the 21-bit binary string may be identified from bits 6 to 21 of the 21-bit binary string. For this vertex, the 5-bit portions for individual ones of the first value, second value, and third value may be encoded into the bits of the (otherwise null) value for the fourth vector component. Further, the 16-bit portions for individual ones of the first value, second value, and third value may be encoded into the bits of the values of the first vector component, second vector component, and third vector component, respectively. In some implementations, the storage of information by storage component 114 may be referred to as "compressed vertex position information."

The space component 108 may be configured to implement one or more instances of the virtual space executed by machine-readable instructions 106 using compressed vertex position information and/or other information. In some implementations, space component 108 may utilize a GPU implementing one or more programs and/or routines referred to as "shaders." In some implementations, the one or more programs and/or routines may include and/or utilize one or more of a vertex shader, a fragment shader, a stream, uniforms, shader attributes, a sampler, geometry shader, tessellation shader, compute shader, and/or other information. A vertex shader may be configured to process individual vertices and/or submit the vertices to a rasterizer creating fragments. A fragment shader may be configured to render pixels on a display screen in small blocks. A stream may comprise a collection of information defining a virtual space that may include one or more of vertex position information, compressed vertex position information, direction information, appearance information, and/or other information. Uniforms may comprise variables used to control individual shader's behaviors. Attributes may comprise individual information that comes into a shader via streams (e.g., individual ones of vertex position information, compressed vertex position information, direction information, appearance information, and/or other information). Samplers may define how certain information may be read into a shader.

In some implementations, space component 108 may be configured to utilize one or more shaders to implement the compressed vertex position information to determine views of the virtual space. In some implementations, space component 108 may utilize a uniform in a shader that may comprise one or more of a scalar, a centroid of a bounding volume of a set of polygons defined by the compressed vertex position information, and/or other information. One or more operations of the shader may transform the individual values from the normalized space back to the decimal space for utilization in determining views of the virtual space. By way of non-limiting illustration, space component 108 may be configured such that, for individual compressed values of individual vector components of individual vertices of the set of vertices defined within the compressed vertex position information, individual compressed values may be multiplied by the scalar and added to an individual value of a corresponding vector component of the centroid, and/or space component 108 may perform other operations.

By way of non-limiting illustration space component 108 may perform a set of operations referred to as "Frac, Add and Madd." Frac may return only the fractional value remaining which may require another operation of division by the channels in the W-component which may result with just desired fractions from −1 to 1 range. These fractions may then be added to the vertex's integer positions converted to float. By way of non-limiting illustration, if we have 24 in the w-component, for an x-component when we divide by 32 we get 0.75*2=1.5−1=0.5; our fraction is half. So we add this to the integer in the x-component of the vertex position. By way of non-limiting illustration this may be 1, and/or other values. A resultant number may be 1.5*scale+base. What this may return is half value of unit scale. This may provide incremental values. A sample code is provided here: highp float3 tiny=((frac(float3(i_position_model.w/32, i_position_model.w/1024, i_position_model.w/32768))*2.0)−1.0); o_position_model=((i_position_model.xyz+tiny)/32767.0)*i_unit16scale+i_unit16base. It is noted that error from additional bits in the value may be encoded into the final fraction, referred to as a "bleed through" from YZ into X and Z into Y.

It is further noted that the above code may translate into about 5 micro op instructions in the shader. If a GPU was not using the full precision model (21 bits per channel) but just uses the 16 bits values this may result in only 1 micro op instruction. This may correspond to the MADD instruction, e.g., "multiply and add."

Returning to FIG. 1, server 102, computing platform(s) 118, and/or external resources 122 may be operatively linked via one or more electronic communication links. For example, such electronic communication links may be established, at least in part, via a network (e.g., network(s) 120) such as the Internet and/or other networks. It will be appreciated that this is not intended to be limiting and that the scope of this disclosure includes implementations in which server 102, computing platform(s) 118, and/or external resources 122 may be operatively linked via some other communication media.

The external resources 122 may include sources of information that are outside of system 100, external entities participating with system 100, and/or other resources. In some implementations, some or all of the functionality attributed herein to external resources 122 may be provided by resources included in system 100.

Server 102 may include electronic storage 116, one or more processors 104, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 116 may comprise electronic storage media that electronically stores information. The electronic storage media of the electronic storage may include one or both of storage that is provided integrally (i.e., substantially non-removable) with the respective device and/or removable storage that is removably connectable to server 102. Removable storage may include, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store files, software algorithms, information determined by processor(s), and/or other information that enables server 102 to function as described herein.

Processor(s) 104 is configured to provide information-processing capabilities in the server 102. As such, processor(s) 104 may include one or more of a digital processor, an analog processor, a digital circuit designed to process information, an analog circuit designed to process information, a state machine, and/or other mechanisms for electronically processing information. Although the processor(s) 104 are shown in FIG. 1 as single entity within the server 102, this is for illustrative purposes only. In some implementations, the processor(s) 104 may include one or more processing units. These processing units may be physically located within the same device or may represent processing functionality of a plurality of devices operating in coordination.

For example, processor(s) 104 may be configured to execute machine-readable instructions 106 including components 108, 110, 112, and/or 114. Processor(s) 104 may be configured to execute components 108, 110, 112, and/or 114 by software; hardware; firmware; some combination of software, hardware, and/or firmware; and/or other mechanisms for configuring processing capabilities on processor(s) 104. It should be appreciated that, although components 108, 110, 112, and/or 114 are illustrated in FIG. 1 as being co-located within a single processing unit, in implementations in which processor 104 includes multiple processing units, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114 and/or other components.

Figure 4:
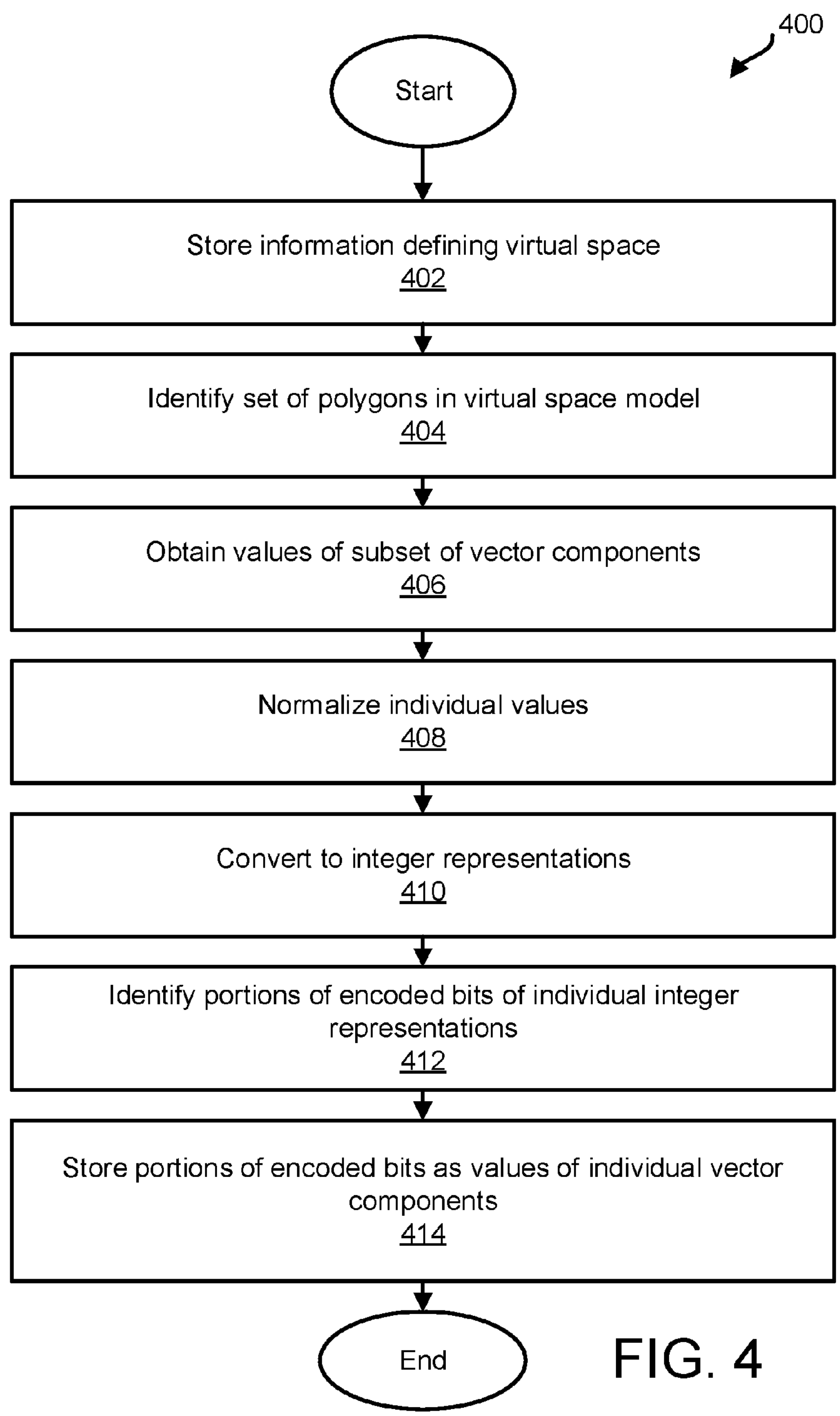
FIG. 4. illustrates a method of reducing storage requirements for storing information defining a virtual space, in accordance with one or more implementations.

FIG. 4 illustrates an implementation of a method 400 of storing information defining a virtual space in a compressed format. The operations of method 400 presented below are intended to be illustrative. In some implementations, method 400 may be accomplished with one or more additional operations not described and/or without one or more of the operations discussed. Additionally, the order in which the operations of method 400 are illustrated in FIG. 4 and described below is not intended to be limiting.

In some implementations, method 400 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Referring now to method 400 in FIG. 4, at an operation 402, information defining a virtual space may be stored. The virtual space may include virtual space content modeled as polygons. An individual polygon may be defined by an individual set of vertices. The information defining the virtual space may include vertex position information, and/or other information. The vertex position information may comprise individual positions of individual vertices of individual polygons, and/or other information. The individual positions may be represented as vectors having vector components. Individual values of individual vector components may be represented as floating point numbers. Individual values of individual vector components may be ended in bits within the electronic storage. An individual floating point number may have one or more of a sign, an exponent, a mantissa, and/or other components. In some implementations, operation 402 may be performed with non-transitory electronic storage the same as or similar to non-transitory electronic storage 116, and/or other components (shown in FIG. 1 and described herein).

At an operation 404, a first set of polygons and/or other sets of polygons of a model of a virtual space may be identified. The first set of polygons may have a first set of vertices and/or other sets of vertices. Individual vertices in the first set of vertices may have individual positions within the virtual space. The individual positions of the individual vertices in the first set of vertices may be represent by individual values of the individual vector components. In some implementations, operation 404 may be performed by one or more physical processors executing a normalization component the same as or similar to normalization component 110 (shown in FIG. 1 and described herein).

At an operation 406, individual values of a subset of the vector components of the individual positions of the individual vertices of the first set of vertices and/or other sets of vertices may be obtained from non-transitory electronic storage. The individual values being encoded in a first quantity of bits and/or other quantity of bits. In some implementations, operation 406 may be performed by one or more physical processors executing a normalization component the same as or similar to normalization component 110 (shown in FIG. 1 and described herein).

At an operation 408, individual values of the subset of vector components may be normalized. In some implementations, operation 406 may be performed by one or more physical processors executing a normalization component the same as or similar to normalization component 110 (shown in FIG. 1 and described herein).

At an operation 410, individual normalized values may be converted to individual integer representations of the individual normalized values. The individual integer representations of the individual normalized values may be encoded in a second quantity of bits, and/or other quantities of bits. The second quantity of bits may be less than the first quantity of bits. In some implementations, operation 410 may be performed by one or more physical processors executing a conversion component the same as or similar to conversion component 112 (shown in FIG. 1 and described herein).

At an operation 412, individual portions of the encoded bits of the individual integer representations of the individual normalized values may be identified. By way of non-limiting illustration, for individual integer representations of the individual normalized values, individual first portions, individual second portions, and/or other portions of the encoded bits may be identified. An individual first portion may be a third quantity of bits and/or other quantities of bits. An individual second portion may be a fourth quantity of bits, and/or other quantities of bits. In some implementations, operation 412 may be performed by one or more physical processors executing a conversion component the same as or similar to conversion component 112 (shown in FIG. 1 and described herein).

At an operation 414, storage of individual identified portions of the encoded bits of the individual integer representations as values of individual ones of the vector components of the positions of individual vertices may be effectuated. The storage of individual identified portions may define compressed vertex position information, and/or other information. By way of non-limiting example, for individual vertices of the first set of vertices, storage of the individual first portions of the encoded bits of the individual integer representations as the encoded bits for the individual values of individual vector components included in the subset of vector components of the positions of the individual vertices in the first set of vertices of the first set of polygons may be effectuated. In some implementations, storage of the individual second portions of the encoded bits of the individual integer representations as the encoded bits of an individual value of another one of the vector components not included in the subset of vector components may be effectuated. In some implementations, operation 414 may be performed by one or more physical processors executing a storage component the same as or similar to storage component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for reducing storage requirements for storing information defining a virtual space, the system comprising:

non-transitory electronic storage storing information defining a virtual space, the virtual space including virtual space content modeled as polygons, an individual polygon being defined by individual vertices of the individual polygon, the information defining the virtual space including vertex position information, the vertex position information comprising individual positions of individual vertices of the individual polygons, the individual positions being represented as vectors having vector components, individual values of the individual vector components being represented in floating-point format, the individual values being encoded in bits within the electronic storage; and one or more physical processors configured by machine-readable instructions to:

identify a first set of polygons of the model of the virtual space, the first set of polygons having a first set of vertices, individual vertices in the first set of vertices having individual positions within the virtual space, the individual positions of the individual vertices in the first set of vertices being represent by individual values of the individual vector components;

obtain, from the non-transitory electronic storage, individual values of a subset of the vector components of the individual positions of the individual vertices of the first set of vertices, the individual values being encoded in a first quantity of bits;

normalize the individual values of the subset of vector components;

convert the individual normalized values to individual integer representations of the individual normalized values, the individual integer representations of the individual normalized values being encoded in a second quantity of bits, the second quantity of bits being less than the first quantity of bits;

identify individual portions of the encoded bits of the individual integer representations of the individual normalized values, such that, for individual integer representations of the individual normalized values, individual first portions and individual second portions of the encoded bits are identified, an individual first portion being a third quantity of bits and an individual second portion being a fourth quantity of bits; and for individual vertices of the first set of vertices, effectuate storage of the individual first portions of the encoded bits of the individual integer representations as the encoded bits for the individual values of individual vector components included in the subset of vector components of the positions of the individual vertices in the first set of vertices of the first set of polygons, and effectuate storage of the individual second portions of the encoded bits of the individual integer representations as the encoded bits of an individual value of another one of the vector components not included in the subset of vector components.

2. The system of claim 1, wherein normalizing individual values of the one or more vector components of the individual vertices of the first set of polygons is based on a bounding volume of the first set of polygons.

3. The system of claim 2, wherein normalizing the individual values of the vector components of the vertices of the first set of polygons is based on a length of the bounding volume and a centroid of the bounding volume, the centroid having a centroid position in the virtual space, the centroid position being represented as a vector having vector components.

4. The system of claim 1, wherein:

the vertex components of the individual vertices comprise a first vector component, a second vector component, a third vector component, and a fourth vector component;

the subset vector components includes the first vector component, the second vector component, and the third vector component; and the other one of the vector components not included in the subset of vector components includes the fourth vector component.

5. The system of claim 4, wherein the vertex components are defined with respect to a three-dimensional coordinate system, and wherein the fourth vector component is otherwise not used to encode information.

6. The system of claim 4, wherein the vertex components are defined within a three-dimensional Cartesian coordinate system such that the first vector component is an x-component, the second vector component is a y-component, the third vector component is a z-component, and the fourth vector component is a w-component.

7. The system of claim 1, wherein converting the individual normalized values to individual integer representations of the individual normalized values comprises one or more bitwise operations.

8. The system of claim 1, wherein identifying individual portions of the encoded bits of the individual integer representations of the individual normalized values comprises identifying most significant bits and least significant bits.

9. The system of claim 1, wherein an individual polygon is defined by an individual set of three vertices.

10. The system of claim 1, wherein:

the individual values of the individual vector components are represented in single-precision floating-point format, such that the first quantity of bits is 32 bits;

the second quantity of bits for encoding the individual integer representations of the individual normalized values is 21 bits;

the third quantity of bits of the individual first portions of the encoded bits of the individual integer representations of the individual normalized values is 16 bits; and the fourth quantity of bits of the individual second portions of the encoded bits of the individual integer representations of the individual normalized values is 5 bits.

11. A method of reducing storage requirements for storing information defining a virtual space, the method being implemented in a computer system comprising one or more physical processors and non-transitory electronic storage storing machine-readable instructions, the method comprising:

storing information defining a virtual space, the virtual space including virtual space content modeled as polygons, an individual polygon being defined by individual vertices of the individual polygon, the information defining the virtual space including vertex position information, the vertex position information comprising individual positions of individual vertices of the individual polygons, the individual positions being represented as vectors having vector components, individual values of the individual vector components being represented in floating-point format, the individual values being encoded in bits within the electronic storage; and identifying a first set of polygons of the model of the virtual space, the first set of polygons having a first set of vertices, individual vertices in the first set of vertices having individual positions within the virtual space, the individual positions of the individual vertices in the first set of vertices being represent by individual values of the individual vector components;

obtaining, from the non-transitory electronic storage, individual values of a subset of the vector components of the individual positions of the individual vertices of the first set of vertices, the individual values being encoded in a first quantity of bits;

normalizing the individual values of the subset of vector components;

converting the individual normalized values to individual integer representations of the individual normalized values, the individual integer representations of the individual normalized values being encoded in a second quantity of bits, the second quantity of bits being less than the first quantity of bits;

identifying individual portions of the encoded bits of the individual integer representations of the individual normalized values, including, for individual integer representations of the individual normalized values, identifying individual first portions and individual second portions of the encoded bits, an individual first portion being a third quantity of bits and an individual second portion being a fourth quantity of bits; and for individual vertices of the first set of vertices, storing the individual first portions of the encoded bits of the individual integer representations as the encoded bits for the individual values of individual vector components included in the subset of vector components of the positions of the individual vertices in the first set of vertices of the first set of polygons, and storing the individual second portions of the encoded bits of the individual integer representations as the encoded bits of an individual value of another one of the vector components not included in the subset of vector components.

12. The method of claim 11, wherein normalizing individual values of the one or more vector components of the individual vertices of the first set of polygons is based on a bounding volume of the first set of polygons.

13. The method of claim 12, wherein normalizing the individual values of the vector components of the vertices of the first set of polygons is based on a length of the bounding volume and a centroid of the bounding volume, the centroid having a centroid position in the virtual space, the centroid position being represented as a vector having vector components.

14. The method of claim 11, wherein:

the vertex components of the individual vertices comprise a first vector component, a second vector component, a third vector component, and a fourth vector component;

the subset vector components includes the first vector component, the second vector component, and the third vector component; and the other one of the vector components not included in the subset of vector components includes the fourth vector component.

15. The method of claim 14, wherein the vertex components are defined with respect to a three-dimensional coordinate system, and wherein the fourth vector component is otherwise not used to encode information.

16. The method of claim 14, wherein the vertex components are defined within a three-dimensional Cartesian coordinate system such that the first vector component is an x-component, the second vector component is a y-component, the third vector component is a z-component, and the fourth vector component is a w-component.

17. The method of claim 11, wherein converting the individual normalized values to individual integer representations of the individual normalized values comprises performing one or more bitwise operations.

18. The method of claim 11, wherein identifying individual portions of the encoded bits of the individual integer representations of the individual normalized values comprises identifying most significant bits and least significant bits.

19. The method of claim 11, wherein an individual polygon is defined by an individual set of three vertices.

20. The method of claim 11, wherein:

the individual values of the individual vector components are represented in single-precision floating-point format, such that the first quantity of bits is 32 bits;

the second quantity of bits for encoding the individual integer representations of the individual normalized values is 21 bits;

the third quantity of bits of the individual first portions of the encoded bits of the individual integer representations of the individual normalized values is 16 bits; and the fourth quantity of bits of the individual second portions of the encoded bits of the individual integer representations of the individual normalized values is 5 bits.

* * * * *